United States Patent
Inoue et al.

(10) Patent No.: US 8,257,802 B2
(45) Date of Patent: Sep. 4, 2012

(54) COATING LIQUID FOR FORMING POLARIZING FILM AND POLARIZING FILM

(75) Inventors: Tetsuo Inoue, Ibaraki (JP); Shoichi Matsuda, Ibaraki (JP); Yuki Fukudome, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 213 days.

(21) Appl. No.: 12/681,092

(22) PCT Filed: Oct. 14, 2008

(86) PCT No.: PCT/JP2008/068532
§ 371 (c)(1), (2), (4) Date: Mar. 31, 2010

(87) PCT Pub. No.: WO2009/066520
PCT Pub. Date: May 28, 2009

(65) Prior Publication Data
US 2010/0221548 A1  Sep. 2, 2010

(30) Foreign Application Priority Data
Nov. 19, 2007  (JP) ................................. 2007-298980

(51) Int. Cl.
*G02B 5/30* (2006.01)
*C09K 19/34* (2006.01)
*C09K 19/32* (2006.01)
*C09K 19/22* (2006.01)

(52) U.S. Cl. ............. 428/1.31; 252/299.61; 252/299.62; 252/299.68

(58) Field of Classification Search ............. 252/299.01, 252/299.5, 299.61, 299.62, 299.68; 428/1.31
See application file for complete search history.

(56) References Cited

U.S. PATENT DOCUMENTS
6,174,394 B1 * 1/2001 Gvon et al. ................... 156/100

FOREIGN PATENT DOCUMENTS
| | | |
|---|---|---|
| JP | 08-511109 A | 11/1996 |
| JP | 2006-267812 A | 10/2006 |
| JP | 2007-241269 A | 9/2007 |
| WO | 2007/125696 A1 | 11/2007 |

OTHER PUBLICATIONS

International Search Report of PCT/JP2008/068532, mailing date of Dec. 9, 2008.
Notification of Transmittal of Translation of the International Preliminary report on Patentability (Form PCT/IB/338) of International Application No. PCT/JP2008/068532 mailed Jul. 8, 2010 with Forms PCT/IB/373 and PCT/ISA/237.

* cited by examiner

*Primary Examiner* — Shean Wu
(74) *Attorney, Agent, or Firm* — Westerman, Hattori, Daniels & Adrian, LLP

(57) ABSTRACT

A coating liquid for forming a polarizing film comprising a lyotropic liquid crystal compound (A) exhibiting light absorption characteristics in a visible light region having a wavelength 400 nm or longer, a lyotropic liquid crystal compound (B) exhibiting no or low light absorption characteristics in the visible light region having a wavelength 400 nm or longer and a solvent dissolving the lyotropic liquid crystal compound (A) and the lyotropic liquid crystal compound (B).

6 Claims, No Drawings

COATING LIQUID FOR FORMING POLARIZING FILM AND POLARIZING FILM

TECHNICAL FIELD

The present invention relates to a coating liquid for forming a polarizing film that is capable of keeping a high transmittance and exhibits high in-film transmittance uniformity, as well as a polarizing film made from the coating liquid.

BACKGROUND ART

There has conventionally been known the method of forming a polarizing film in such manner that an aqueous solution (a coating liquid) including a lyotropic liquid crystal compound and water is applied to a substrate, dried and orientated thereon.

The polarizing film thus made from the aqueous solution including a lyotropic liquid compound can reduce its film thickness significantly in comparison with a widely used polarizing film formed by staining polyvinyl alcohol with iodine. Therefore, usefulness of it is highly expected.

DISCLOSURE OF THE INVENTION

Problem to be Solved by the Invention

The above-mentioned conventional polarizing film made from the aqueous solution including a lyotropic liquid compound, however, exhibits an excessive absorbance (optical density) per unit film thickness due to its high absorbance capacity. Therefore, intensity of transmitted light lowers significantly in contrast with intensity of incoming light. This tendency develops as thickness of the polarizing film is made thicker. For securing certain extent or more of intensity of transmitted light, the coating liquid needs to be applied so that the film thickness after drying becomes 0.5 µm or thinner. Further, as is the case with a thin film thickness, even slight nonuniformity of coating-liquid application (nonuniformity of film thickness) deteriorates in-film transmittance uniformity.

Under the above-described circumstances, it has been desired to create: a coating liquid for forming a polarizing film wherein the coating liquid can be applied to the film with proper film thickness by lowering optical density; and a polarizing film that exhibits excellent in-film transmittance uniformity while a high transmittance is kept.

The present invention has been made to resolve the above-described conventional problem and an object thereof is to provide a coating liquid for forming a polarizing film that is capable of keeping a high transmittance and exhibits high in-film transmittance uniformity, as well as a polarizing film made from the coating liquid.

Means for Solving the Problem

To achieve the above object, the present invention provides a coating liquid for forming a polarizing film characterized by comprising a lyotropic liquid crystal compound (A) exhibiting light absorption characteristics in a visible light region having a wavelength 400 nm or longer, a lyotropic liquid crystal compound (B) exhibiting no or low light absorption characteristics in the visible light region having a wavelength 400 nm or longer and a solvent dissolving the lyotropic liquid crystal compound (A) and the lyotropic liquid crystal compound (B).

In this specification, the visible light region is referred to as a region having a wavelength that ranges from 380 nm to 780 nm.

In a preferable embodiment, it is preferable that the coating liquid for forming a polarizing film exhibits liquid crystallinity therein at least a part of a total solid concentration ranging from 1% to 50% by weight.

In a preferable embodiment, it is preferable that a weight ratio (A:B) of the lyotropic liquid crystal compound (A) and the lyotropic liquid crystal compound (B) ranges from 90:10 to 50:50.

In a preferable embodiment, it is preferable that the lyotropic liquid crystal compound (A) is an azo based compound, an anthraquinone based compound, a perylene based compound, a quinophthalone based compound, a naphtoquinone based compound or a merocyanine based compound.

In a preferable embodiment, it is preferable that the lyotropic liquid crystal compound (B) is an aromatic melamine based compound, a benzimidazole based compound, a phenanthro quinoxaline based compound, an acenaphtho quinoxaline based compound, a long chain alkyl based compound or a cellulose based compound.

Further, the polarizing film according to the present invention is characterized in that any of the above-described coating liquids is applied to a substrate and dried thereon for forming the polarizing film.

Effect of the Invention

There is provided a polarizing film that is capable of keeping a high transmittance and exhibits high in-film transmittance uniformity.

BEST MODE FOR CARRYING OUT THE INVENTION

[Outline of the Present Invention]

The coating liquid for forming a polarizing film according to the present invention is characterized by comprising:
(1) a lyotropic liquid crystal compound (A) exhibiting light absorption characteristics in a visible light region having a wavelength 400 nm or longer,
(2) a lyotropic liquid crystal compound (B) exhibiting no or low light absorption characteristics in the visible light region having a wavelength 400 nm or longer, and
(3) a solvent dissolving the lyotropic liquid crystal compound (A) and the lyotropic liquid crystal compound (B).

In the above-mentioned coating liquid for forming a polarizing film, the lyotropic liquid crystal compound (A) exhibiting light absorption characteristics in the visible light region having a wavelength 400 nm or longer and the lyotropic liquid crystal compound (B) exhibiting no or low light absorption characteristics in the visible light region having a wavelength 400 nm or longer are mixed. Therefore, in the coating liquid, even if the contained amount of the lyotropic liquid crystal compound (A) per unit film thickness decreases, the orientation of the lyotropic liquid crystal compound (B) compensates the loss so that a stable liquid crystal phase can be formed. As a result, since orientational structure in the whole film is kept, it is possible to form a polarizing film in which in-film transmittance uniformity is favorably kept by lowering absorbance (optical density) per unit film thickness without lowering the dichroic ratio.

[Lyotropic Liquid Crystal Compound]

In the present invention, a lyotropic liquid crystal compound is referred to as a compound which causes a phase transition between an isotropic phase and a liquid crystal phase by changing temperature, solution concentration, and the like. Types of liquid crystal phases are not particularly restricted; a nematic liquid crystal phase, a smectic liquid crystal phase, cholesteric liquid crystal phase, etc., can be taken as examples. The foregoing liquid crystal phases can be identified by optical patterns of their own observed with a polarizing microscope.

[Lyotropic Liquid Crystal Compound (A)]

The lyotropic liquid crystal compound (A) according to the present invention exhibits light absorption characteristics in a visible light region having a wavelength 400 nm or longer, wherein the visible light region generally ranges from 350 nm to 800 nm. It is preferable that the lyotropic liquid crystal compound (A) exhibits its maximum light absorption capacity when the wavelength ranges from 400 nm to 700 nm, more preferably, from 460 nm to 660 nm, or even more preferably, from 520 nm to 620 nm. Further, it is preferable that molecules of the lyotropic liquid crystal compound (A) make greater transition moment in long axis direction than in short axis direction or make greater transition moment in short axis direction than in long axis direction, which means absorption dichroism. The lyotropic liquid crystal compound (A) with above such absorption dichroism is orientated whereby the compound (A) can form a polarizing film.

It is preferable that the lyotropic liquid crystal compound (A) may be selected from an azo based compound, an anthraquinone based compound, a perylene based compound, a quinophthalone based compound, napthoquinone based compound, or a merocyanine based compound. The foregoing compounds exhibit both liquid crystalline characteristics (lyothropic liquid crystalline characteristics) in a solution state and absorption dichroism.

It is preferable that the lyotropic liquid crystal compound (A) is an azo based compound or a perylene based compound because those compounds exhibit excellent orientational characteristics so as to make absorption dichroism in a visible light region large.

It is preferable that the azo based compound is a compound expressed with below-indicated general chemical formula 1. The formula 1 accounts for respective chemical and numerical symbols as follows: Q1 represents a phenyl group or a naphthyl group (each of those groups may have a substituent); Q2 and Q3 individually represent a phenylene group or a naphthylene group, (each of those groups may have a substituent); R represents a hydrogen atom, an alkyl group inclusive of 1-3 carbon atom(s), an acetyl group, a benzoyl group, or a phenyl group (which may have a substituent); k represents an integer ranging from 0 to 4; l represents an integer ranging from 0 to 4 (however, the essential condition of "k+l≦4" shall be satisfied); m represents an integer ranging from 0 to 2; and M represents a counterion.

The azo based compound expressed with the general chemical formula 1 can be obtained by applying diazotization and coupling reaction to two kinds of compounds each of which includes an amino group, for instance, in accordance with "Logical Production Dye Chemistry" or "Riron-Seizo Senryo-Kagaku" (Logical Manufacturing, Dye Chemistry) written by Yutaka HOSODA (pp. 135-152, Ver. 5, published by Gihodo on Jul. 15, 1968). The number of substituent groups Q2 bonded through an azo bond can be made to increase by repeating diazotization and coupling reaction.

[Chemical Formula 1]

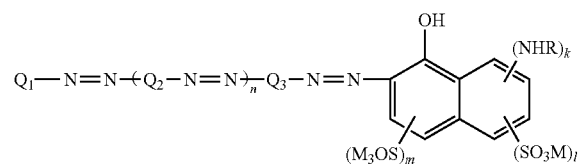

(1)

It is preferable that a perylene based compound is a compound expressed with below-indicated general chemical formula 2. The formula 2 accounts for respective chemical and numerical symbols as follows: Q4 represents an expression (a) or an expression (b); L1, L2, L3 and L4 individually represent a hydrogen atom, a 1-5C alkyl group, a 1-5C alkoxy group, a halogen atom, a hydroxyl group, or an amino group; o, p, q and r individually represent an integer ranging from 0 to 2; s represents an integer ranging from 0 to 4 (however, the essential condition of "o+p+q+r+s≦8" shall be satisfied); and M represents a counterion. The expression (a) accounts for respective numerical symbols as follows: plural number of Q5 individually represent a phenyl group, a phenylalkyl group or a naphthyl group (each of those groups may have a substituent); L5 represents a hydrogen atom, a 1-5C alkyl group, a 1-5C alkoxy group, a halogen atom, a hydroxyl group or an amino group; and t represents an integer ranging from 0 to 4.

The perylene based compound expressed with the general chemical formula 2 can be obtained by the method described in Published Japanese translation of PCT International Publication for Patent Application No. 08-511109, for instance.

[Chemical Formula 2]

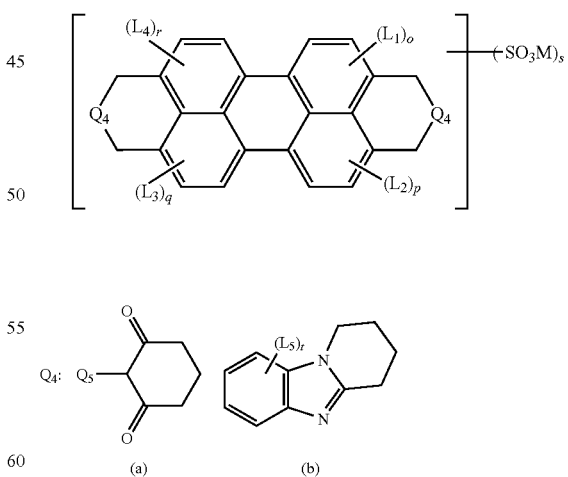

(2)

Since the lyotropic liquid crystal compound, expressed with the general chemical formulas 1 and 2, solely forms a stable liquid crystal phase by itself, the compound has high orientation property. As a result, a polarizing film with large absorption dichroism in a visible light region can be obtained.

[Lyotropic Liquid Crystal Compound (B)]

The lyotropic liquid crystal compound (B) according to the present invention exhibits no or low light absorption characteristics in a visible light region having a wavelength 400 nm or longer, wherein the visible light region generally ranges from 350 nm to 800 nm. Although it is preferable that the lyotropic liquid crystal compound (B) exhibits no light absorption characteristics at 400 nm or longer of wavelength, the compound (B) may be a compound which exhibits slight light absorption characteristics in the visible light region having a wavelength of approximately 400 nm (a compound exhibiting low light absorption characteristics at 400 nm or longer of wavelength). A compound exhibiting "low light absorption characteristics" referred to in this specification as an equivalence of the compound (B) includes a compound which has a molar absorption coefficient of 50 or less at 400 nm of wavelength.

Since an absorption band of a wavelength approximately 400 nm hardly exerts harmful influences on optical characteristics of a polarizing film which would be formed later, a compound which exhibits low light absorption characteristics at 400 nm or longer of wavelength can be used.

It is preferable that the lyotropic liquid crystal compound (B) exhibits its maximum light absorption capacity when the wavelength ranges from 200 nm to 400 nm, more preferably, from 240 nm to 400 nm, even more preferably, from 290 nm to 390 nm. Further, it is preferable that molecules of the lyotropic liquid crystal compound (B) make greater transition moment in long axis direction than in short axis direction or make greater transition moment in short axis direction than in long axis direction, which means absorption dichroism. The foregoing lyotropic liquid crystal compound (B) is solely orientated, whereby the compound (B) can be used as a phase difference film.

It is preferable that the lyotropic liquid crystal compound (B) is an aromatic melamine based compound, a benzimidazole based compound, a phenanthroquinoxaline based compound, an acenaphthoquinoxaline based compound, a long chain alkyl based compound or a cellulose based compound. The preceding compounds exhibit both liquid crystalline characteristics (lyotropic liquid crystalline characteristics) in a solution state and no or low light absorption characteristics in the visible light region having a wavelength 400 nm or longer. The foregoing lyotropic liquid crystal compound (B) makes optical density of the lyotropic liquid crystal compound (A) lower according to their blend ratio, while the compound (B) does not inhibit the orientation of the lyotropic liquid crystal compound (A) and also exhibits fine compatibility with the lyotropic liquid crystal compound (A).

It is preferable that the lyotropic liquid crystal compound (B) is an acenaphthoquinoxaline based compound. It is preferable that the foregoing acenaphthoquinoxaline based compound is a compound expressed with below-indicated general chemical formula 3. The formula 3 accounts for respective symbols as follows: k represents an integer ranging from 0 to 4; l and m each represent an integer ranging from 0 to 3; n represents an integer ranging from 1 to 4 (wherein values of k, l, m and n shall satisfy the following expression: $k+l+m+n \leq 10$).

[Chemical Formula 3]

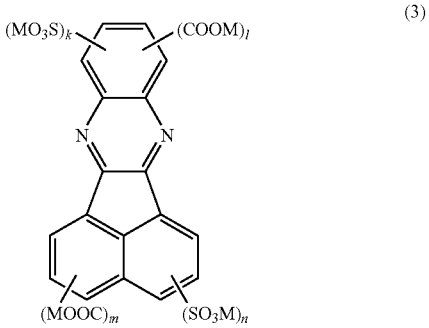

(3)

Since the compound expressed with the general chemical formula 3 solely forms a stable liquid crystal phase by itself, the compound does not inhibit the orientation of the lyotropic liquid crystal compound (A). The foregoing characteristics of the compound make it possible to obtain a coating liquid that has low optical density while securing capacity for forming a polarizing film of the liquid.

As described in Published Japanese translation of PCT international publication for patent application No. 2007-512236, the acenaphthoquinoxaline based compound can be obtained by a condensation reaction of, for instance, acenaphtenequinone or its derivative, and o-phenylenediamine or its derivative.

In the general chemical formula 3, it is preferable that M is a hydrogen atom, an alkali metal atom, an alkaline-earth metal atom, a metallic ion, or a substituted or non-substituted ammonium ion. $Ni^{2+}$, $Fe^{3+}$, $Cu^{2+}$, $Ag^+$, $Zn^{2+}$, $Al^{3+}$, $Pd^{2+}$, $Sn^{2+}$, $Co^{2+}$, $Mn^{2+}$, $Ce^{3+}$, etc. can be taken as examples of the metallic ion. For instance, in the case where a polarizing film of the present invention is formed from an aqueous solution, one which promotes solubility in water can be selected as M at first and after film formation, another one which is insoluble or hardly soluble in water can be substituted so as to enhance high water resistance.

[Solvent]

In the present invention, a solvent which dissolves the lyotropic liquid crystal compound (A) and the lyotropic liquid crystal compound (B) is not particularly restricted as long as the solvent can dissolve both the liotropic liquid compounds (A) and (B). Specifically it is preferable that the solvent is a hydrophilic solvent. Water, alcohol or cellosolve, etc. can be taken as examples of the hydrophilic solvent.

[Coating Liquid for Forming Polarizing Film]

A coating liquid for forming a polarizing film formed by dissolving the lyotropic liquid crystal compound (A) and the lyotropic liquid crystal compound (B) with a solvent may arbitrarily include an additive such as a surface acting agent, an antioxidizing agent, an antistatic agent, etc. It is preferable that the coating liquid for forming a polarizing film exhibits liquid crystallinity therein at least a part of a total solid concentration ranging from 1% to 50% by weight.

It is preferable that a weight ratio (A:B) of the lyotropic liquid crystal compound (A) and the lyotropic liquid crystal compound (B) ranges from 90:10 to 50:50. It is more preferable that the weight ratio (A:B) ranges from 80:20 to 70:30. The above-specified blend ratio makes it possible to adjust and obtain a coating liquid for forming a polarizing film that can be applied with a proper application thickness by lowering optical density. Further, a polarizing film formed by applying the said coating liquid can realize a polarizing film consisting of the lyotropic liquid crystal compounds, the polarizing film bringing favorable in-film transmittance uniformity.

Further, regarding the thus adjusted coating liquid for forming a polarizing film, its absorbance under a concentration of 1 mol % (0.5 mm of optical path length) can be regularized preferably in a range from 2.0 to 3.5, or more preferably, from 2.5 to 3.0, when its absorption spectrum is measured (in a visible light region 400 nm or longer).

Regarding a conventional coating liquid for forming a polarizing film, its absorbance under a concentration of 1 mol % (0.5 mm of optical path length) is about 4.0. Accordingly, it is apparent that the optical density of the coating liquid for forming a polarizing film directed to the present embodiment is much smaller than that of the conventional coating liquid.

There is no particular limitation with respect to methods for mixing the lyotropic liquid crystal compound (A) and the lyotropic liquid crystal compound (B). For instance, to make the coating liquid, the lyotropic liquid crystal compound (A) and the lyotropic liquid crystal compound (B) may be mixed at first and thereafter, a solvent may be added to the mixture of compounds (A) and (B). Alternatively, either the lyotropic liquid crystal compound (A) or the lyotropic liquid crystal compound (B) may be mixed with the solvent first and thereafter, the other lyotropic liquid compound may be added to the mixture. Alternatively, the lyotropic liquid crystal compound (A) and the lyotropic liquid crystal compound (B) may independently be mixed with the solvent and thereafter, the two mixtures may be mixed together to complete the coating liquid.

[Polarizing Film]

A polarizing film of the present embodiment is obtained by applying the coating liquid to a substrate and drying the coating liquid thereon.

The above-mentioned substrate is used to uniformly apply the coating liquid thereto. As the foregoing substrate, there can be used, for instance, a glass substrate, a quartz substrate, a polymer film, a plastic substrate, a metallic plate such as aluminum, iron or the like, a ceramic substrate or a silicon wafer, etc., from which an appropriate substrate is arbitrarily selected and used. Further, regarding methods of applying and drying the coating liquid in forming a polarizing film, appropriate methods can be arbitrarily adopted.

The lyotropic liquid crystal compounds (A) and (B) can be orientated by an arbitrary method in the process of volatilization of the solvent. For instance, by using a substrate which has undergone an orientation process, each lyotropic liquid crystal compound can be orientated in parallel or vertical to the orientation process direction of the substrate. As a method of thus orientating the lyotropic liquid crystal compounds, a method using a magnetic field, a method using an electric field or the like can be arbitrarily adopted in addition to normal methods for orientation.

According to the present embodiment, a film thickness of the polarizing film can be regulated as, for instance, 0.6 μm or thicker. Specifically, the film thickness of the polarizing film preferably ranges from 0.6 μm to 1.5 μm, more preferably, from 0.7 μm to 0.9 μm.

Further, it is preferable that mean transmittance of the polarizing film is 30% or larger, more preferably, 40% or larger.

Further, it is preferable that mean dichroic ratio of the polarizing film is 10 or larger, more preferably, 15 or larger.

Further, it is preferable that polarizing film satisfies the following two conditions: mean transmittance thereof is 40% or larger; and a value of [mean transmittance/film thickness] ranges from 40 to 70.

The polarizing film thus formed is suitable for use in a liquid crystal display device. Regarding a liquid crystal display, there can be taken a display monitor for personal or laptop computer, photocopy machine or the like as examples.

Example

In this example, a coating liquid exhibiting a nematic liquid crystal phase at room temperature (23° C.) has been prepared by mixing the following two aqueous solutions: 65 parts of an aqueous solution (product name "NO15" by Optiva Inc.) including a perylene based lyotropic liquid crystal compound (nematic liquid crystal compound) with a concentration of 16% by weight, the aqueous solution exhibiting its maximum light absorption capacity at 570 nm of wavelength; and 35 parts of an aqueous solution including quinoxaline-acenaphthene-2,5-disulfonate (acenaphthoquinoxaline based compound) with a concentration of 16% by weight, the aqueous solution exhibiting little light absorption characteristics at 400 nm of wavelength or longer but exhibiting its maximum light absorption capacity at 380 nm of wavelength.

The above coating liquid has been applied to a glass substrate by a slide-type coater so as to obtain 5 μm of application thickness, then air-dried at 23° C. Table 1 shows several properties measured for the thus obtained polarizing film with the glass substrate (optically isotropous).

Comparative Example 1

In a comparative example 1, there has been used an aqueous solution (product name "NO15" by Optiva Inc.) with a concentration of 16% by weight of the lyotropic liquid crystal compound (nematic liquid crystal compound) that exhibits its maximum light absorption capacity under 570 nm of wavelength. The aqueous solution has been applied to a glass substrate by a slide-type coater so as to obtain 5 μm of application thickness, then air-dried at 23° C. Table 1 shows several properties measured for the thus obtained polarizing film with the glass substrate (optically isotropous).

Comparative Example 2

In a comparative example 2, there has been used an aqueous solution (product name "NO15" by Optiva Inc.) with a concentration of 16% by weight of the lyotropic liquid crystal compound that exhibits its maximum light absorption capacity under 570 nm of wavelength. The aqueous solution has been applied to a glass substrate by a slide-type coater so as to obtain 3 μm of application thickness, then air-dried at 23° C. Table 1 shows several properties measured for the thus obtained polarizing film with the glass substrate (optically isotropous).

TABLE 1

| | Thickness (μm) | Mean Transmittance (%) | Mean Dichroic Ratio | In-plane Transmittance Variation (%) |
|---|---|---|---|---|
| Example | 0.8 | 41 | 18 | 1 |
| Comparative Example 1 | 0.8 | 28 | 16 | 1 |
| Comparative Example 2 | 0.5 | 41 | 18 | 3 |

Transmittance of the respective polarizing films shown in Table 1 have been measured with a spectral photometer (Product name "V-7100" by JASCO Corporation).

For calculating in-plane transmittance variation, an "8 cm long and 8 cm wide" sample has been prepared for each of those polarizing films. At intervals of 2 cm from each side of the sample, three points per vertical directional lines and three points per horizontal directional line, a total of nine points has been taken as object of transmittance measurement. Figures of mean transmittance and in-plane transmittance variation have been calculated from measurement result of the nine points with respect to each sample. It is to be noted that in-plane transmittance variation corresponds to a difference of a maximum value of transmittance and a minimum value of transmittance i.e., (maximum value−minimum value).

For calculating a dichroic ratio of the respective polarizing films, values for k1 and k2 have been measured and assigned in the expression below, wherein measuring light that is 600 nm wavelength of linearly polarized light has been made to come in the respective films for measurement by using a spectral photometer equipped with a Glan-thompson polarizer (Product name "U-4100" by JASCO Corporation).

$$\text{Dichroic Ratio} = \frac{\log(1/k2)}{\log(1/k1)} \quad \text{[Expression 1]}$$

It is to be noted that k1 represents transmittance of linearly polarized light coming in a maximum transmittance direction and k2 represents transmittance of other linearly polarized light coming in a direction orthogonal to the maximum transmittance direction.

At intervals of 2 cm from each side of the sample, three points per vertical directional lines and three points per horizontal directional line, a total of nine points has been taken as measurement object to obtain a mean value.

According to Table 1, the polarizing film of the present embodiment has obtained 41% of mean transmittance and 1% of in-plane transmittance variation. The measurement result implies that the polarizing film of the example exhibits high mean transmittance and low in-plane transmittance variation.

On the other hand, the polarizing film of the comparative example 1 has obtained 1% of low in-plane transmittance variation and 28% of low mean transmittance. Further, the polarizing film of the comparative example 2 has obtained 41% of high mean transmittance and 3% of high in-plane transmittance variation and further, the value of [mean transmittance/film thickness] is 82 that is the value higher than 70.

INDUSTRIAL APPLICABILITY

As described above, in accordance with the coating liquid for forming a polarizing film of the present invention, there is provided a polarizing film that is capable of keeping a high transmittance and exhibits high in-film transmittance uniformity. The polarizing film thus formed is highly useful in, for example, the development of display quality of a liquid crystal display device.

The invention claimed is:

1. A coating liquid for forming a polarizing film comprising:
    a lyotropic liquid crystal compound (A) exhibiting light absorption characteristics in a visible light region having a wavelength 400 nm or longer;
    a lyotropic liquid crystal compound (B) exhibiting no or low light absorption characteristics in the visible light region having a wavelength 400 nm or longer; and
    a solvent dissolving the lyotropic liquid crystal compound (A) and the lyotropic liquid crystal compound (B).

2. The coating liquid for forming a polarizing film according to claim 1,
    wherein the coating liquid for forming a polarizing film exhibits crystallinity therein at least a part of a total solid concentration ranging from 1% to 50% by weight.

3. The coating liquid for forming a polarizing film according to claim 1,
    wherein a weight ratio (A:B) of the lyotropic liquid crystal compound (A) and the lyotropic liquid crystal compound (B) ranges from 90:10 to 50:50.

4. The coating liquid for forming a polarizing film according to claim 1,
    wherein the lyotropic liquid crystal compound (A) is an azo based compound, an anthraquinone based compound, a perylene based compound, a quinophthalone based compound, a naphtoquinone based compound or a merocyanine based compound.

5. The coating liquid for forming a polarizing film according to claim 1,
    wherein the lyotropic liquid crystal compound (B) is an aromatic melamine based compound, a benzimidazole based compound, a phenanthroquinoxaline based compound, an acenaphthoquinoxaline based compound, a long chain alkyl based compound or a cellulose based compound.

6. A polarizing film formed by applying the coating liquid for forming a polarizing film according to claim 1 to a substrate and drying the coating liquid applied to the substrate.

* * * * *